(12) United States Patent
Uchino et al.

(10) Patent No.: US 9,673,955 B2
(45) Date of Patent: Jun. 6, 2017

(54) MOBILE STATION

(71) Applicant: NTT DOCOMO, INC., Tokyo (JP)

(72) Inventors: Tooru Uchino, Tokyo (JP); Hideaki Takahashi, Tokyo (JP); Kenichiro Aoyagi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/402,330

(22) PCT Filed: Jul. 30, 2013

(86) PCT No.: PCT/JP2013/070547
§ 371 (c)(1),
(2) Date: Nov. 20, 2014

(87) PCT Pub. No.: WO2014/024725
PCT Pub. Date: Feb. 13, 2014

(65) Prior Publication Data
US 2015/0146698 A1    May 28, 2015

(30) Foreign Application Priority Data
Aug. 6, 2012  (JP) ................................. 2012-174141

(51) Int. Cl.
*H04L 5/00*       (2006.01)
*H04W 56/00*   (2009.01)

(52) U.S. Cl.
CPC .......... *H04L 5/0058* (2013.01); *H04L 5/0035* (2013.01); *H04W 56/00* (2013.01)

(58) Field of Classification Search
CPC .......... H04L 5/0058; H04L 5/00; H04W 56/00
See application file for complete search history.

(56) References Cited

U.S. PATENT DOCUMENTS

2006/0270431 A1   11/2006   Yoshi
2015/0063263 A1    3/2015   Wei

FOREIGN PATENT DOCUMENTS

| RU | 2365040 C2    | 8/2009 |
| WO | 2011082671 A1 | 7/2011 |
| WO | 2012/039289 A1 | 3/2012 |
| WO | 2012/042736 A1 | 4/2012 |

OTHER PUBLICATIONS

International Search Report issued in PCT/JP2013/070547 mailed on Sep. 3, 2013 (4 pages).
Written Opinion of the International Searching Authority issued in PCT/JP2013/070547 mailed on Sep. 3, 2013 (3 pages).
Intel Corporation; "Remaining open issues on timing and pathloss reference for sTAG"; 3GPP TSG-RAN WG2 #77, R2-120821; Dresden, Germany; Feb. 6-10, 2012 (3 pages).

(Continued)

*Primary Examiner* — Robert M Morlan
*Assistant Examiner* — Mandish Randhawa
(74) *Attorney, Agent, or Firm* — Osha Liang LLP

(57) ABSTRACT

An objective is to appropriately select a "timing reference cell" and a "Pathloss reference cell" for an Scell in an sTAG. A mobile station UE according to the present invention includes a second management unit 11B configured to use a "UL Cell" managed in association with a "DL only Cell" where to perform a downlink communication only, as a Pcell or an Scell in a pTAG.

1 Claim, 6 Drawing Sheets

(56) References Cited

OTHER PUBLICATIONS

Intel Corporation; "Timing and pathloss reference for SCell to support MTA and inter-band CA"; 3GPP TSG-RAN WG2 #76, R2-116271; San Francisco, USA; Nov. 14-18, 2011 (4 pages).

ETRI; "Timing and Path loss References for SCell"; 3GPP TSG RAN WG2 #76, R2-116218; San Francisco, USA; Nov. 14-18, 2011 (2 pages).

Samsung; "Discussions on timing reference for SCell(s) in sTAG"; 3GPP TSG-RAN WG2#76 Meeting, R2-116067; San Francisco, USA; Nov. 14-18, 2011 (4 pages).

3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Jun. 2012 (201 pages).

Nokia Corporation; "Introduction of Carrier aggregation enhancements"; 3GPP TSG-RAN2 Meeting #78, R2-122076; Prague, Czech Republic; May 21-25, 2012 (10 pages).

Office Action issued in corresponding Eurpoean Application No. 13828726.3, mailed on Jun. 9, 2016 (4 pages).

Office Action issued in corresponding Canadian Application No. 2870063, mailed on Jul. 15, 2016 (4 pages).

Office Action issued in corresponding Russian Application No. 2015106414/07 (010399) dated Feb. 24, 2016, and English translation thereof (10 pages).

Office Action issued in corresponding Canadian Application No. 2,870,063 dated Jan. 4, 2016 (4 pages).

Extended Search Report issued in corresponding European Application No. 13828726.3, mailed Aug. 31, 2015 (6 pages).

Huawei, HiSilicon; "RACH issues for supporting multiple TAs"; 3GPP TSG-RAN WG2 Meeting #75, R2-113994; Athens, Greece; Aug. 22-26, 2011 (4 pages).

Office Action issued in corresponding Canadian Application No. 2,870,063, mailed Jan. 25, 2017 (4 pages).

FIG. 5

|  | PATHLOSS REFERENCE CELL | TIMING REFERENCE CELL |
|---|---|---|
| pTAG | PCELL | PCELL |
| sTAG | PCELL OR SIB2 LINKED CELL (NW CAN SELECT) | PCELL |
| sTAG | SIB2 LINKED CELL (NW CANNOT SELECT) | UE SELECTS FROM THE SAME TAG (NW CANNOT SELECT) |

MOBILE STATION

TECHNICAL FIELD

The present invention relates to a mobile station.

BACKGROUND ART

A mobile communication system supporting LTE (Long Term Evolution)-Advanced can perform CA (Carrier Aggregation) using a Pcell (Primary Cell) that is a serving cell in a PCC (Primary Component Carrier) and an Scell (Secondary Cell) that is a serving cell in an SCC (Secondary Component Carrier).

Moreover, radio characteristics (delay characteristic and attenuation characteristic) differ among cells. For this reason, when "Inter-band CA" is performed in the mobile communication system supporting LTE-Advanced, TA (Timing Alignment) control suitable for each of cells having different radio characteristics needs to be performed.

Specifically, in LTE-Advanced, in the case of performing "Inter-band CA", a Pcell and Scells are grouped into TAGs (Timing Advance Groups) each having equivalent radio characteristics as illustrated in FIG. 4, and TA control is performed in each of the TAGs.

Such TA control is called as "Multiple Timing Advances (MTA) control". Note that the above groups include two types, that is, a pTAG (primary TAG) that includes a Pcell, and an sTAG (secondary TAG) that only includes Scells.

In the meeting for developing standardization of LTE, agreements as illustrated in FIG. 5 was made for "Pathloss reference cells" and "timing reference cells" in the TAGs.

Here, the "timing reference cell" is a "DL Cell" to which is referred in order to adjust timing in a downlink or a clock in a mobile station UE. The "DL Cell" here indicates a downlink cell where to perform a downlink communication.

Moreover, the "Pathloss reference cell" is a "DL Cell" to which is referred in order to estimate a path loss in the downlink.

Specifically, for a Pcell in the pTAG, it is defined that the "timing reference cell" and the "Pathloss reference cell" are the Pcell, as illustrated in FIG. 5 and FIG. 6.

Moreover, it is defined that the "timing reference cell" for an Scell in the pTAG is the Pcell.

Moreover, it is defined that the "Pathloss reference cell" for an Scell in the pTAG is the Pcell, or one of "SIB2 linked cells" of the Scell designated by a network.

Here, the "SIB2 linked cell" of the Scell is a "UL Cell" linked with the Scell by an SIB2. Here, the "UL Cell" indicates an uplink cell where to perform an upstream communication.

Moreover, it is defined that the "timing reference cell" for the Scell in an sTAG is one of cells in the sTAG selected by the mobile station UE, as illustrated in FIG. 5 and FIG. 7.

Here, the network is unable to designate the "timing reference cell" for the Scell in the sTAG.

In addition, the "Pathloss reference cell" for the Scell in the sTAG is one of "SIB2 linked cells" in the Scell selected by the mobile station UE.

Here, the network is unable to designate the "Pathloss reference cell" for the Scell in the sTAG.

PRIOR ART DOCUMENT

Non-Patent Document

Non-patent document 1: 3GPP TS36.300
Non-patent document 2: 3GPP contribution R2-122076

SUMMARY OF THE INVENTION

In LTE-Advanced, it is possible to install a "DL only Cell (downlink only cell)" configured such that only a downlink communication can be performed but an uplink communication cannot be performed.

Here, when the "DL only Cell" is associated with an Scell in an sTAG by an SIB2, there is a possibility that the mobile station UE may select the "DL only Cell" as the "timing reference cell" and the "Pathloss reference cell" for an Scell.

In this case, there is no problem if the "DL only Cell" and the Scell have equivalent radio characteristics. However, for example, in the case where the "DL only Cell" and the Scell are cells of different bands, or other similar cases, there is a problem that it is not possible to estimate a correct path loss or timing.

Therefore, the present invention was made in view of the abovementioned problem, and an objective thereof is to provide a mobile station capable of appropriately selecting a "timing reference cell" and a "Pathloss reference cell" for an Scell in an sTAG.

A first feature according to the present invention is summarized as a mobile station configured to be capable of performing carrier aggregation using a primary cell and a secondary cell, the mobile station provided with: a first management unit configured to manage a primary timing adjustment group that includes the primary cell, and a secondary timing adjustment group that does not include the primary cell; and a second management unit configured to manage an uplink cell where to perform an uplink communication and a downlink cell where to perform a downlink communication while associating the uplink and downlink cells with each other, in which: the first management unit is configured to manage each of a timing reference cell and a Pathloss reference cell for each of the primary cell and the secondary cell in the primary timing adjustment group, as the primary cell or a cell designated by a network; the first management unit is configured not to allow the network to designate a timing reference cell and a Pathloss reference cell for the secondary cell in the secondary timing adjustment group; and the second management unit is configured to use the "uplink cell" managed in association with the "downlink only cell" where to perform the downlink communication only, as the primary cell or the secondary cell in the primary timing adjustment group.

BRIEF DESCRIPTION OF THE DRAWINGS

FIG. 5 is a view for explaining the conventional mobile communication system.

DETAILED DESCRIPTION (Mobile Communication System According to First Embodiment of Present Invention)

A mobile communication system according to a first embodiment of the present invention will be described with reference to FIG. 1 to FIG. 3.

The mobile communication system according to the present embodiment employs LTE-Advanced, and is configured to allow CA to be performed using a Pcell and an Scell.

Specifically, the mobile communication system according to the present embodiment is configured to allow "Inter-band CA" to be performed.

Figure 1:
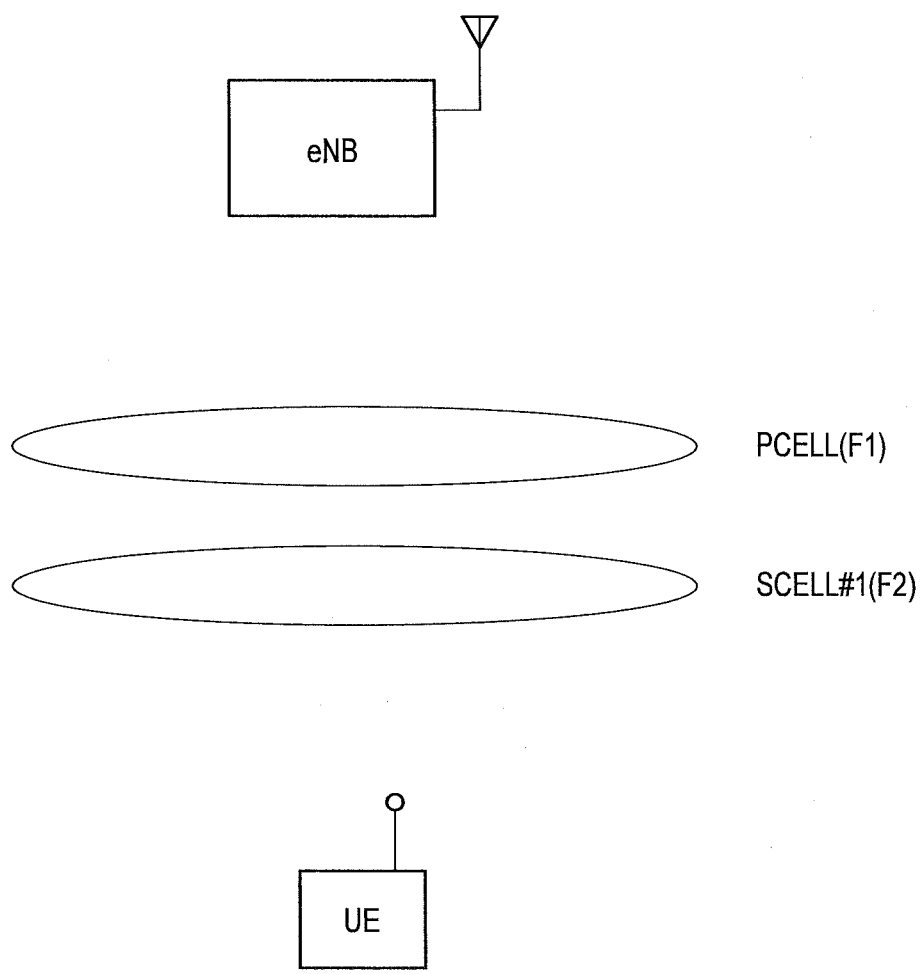
FIG. 1 is an entire configuration view of a mobile communication system according to a first embodiment of the present invention.

The mobile communication system according to the present embodiment is provided with a radio base station eNB that manages a Pcell (f1) and an Scell#1 (f2) of a mobile station UE, as illustrated in FIG. 1.

Note that, the Pcell is a serving cell in a PCC and the Scell#1 is a serving cell in an SCC#1.

Figure 2:
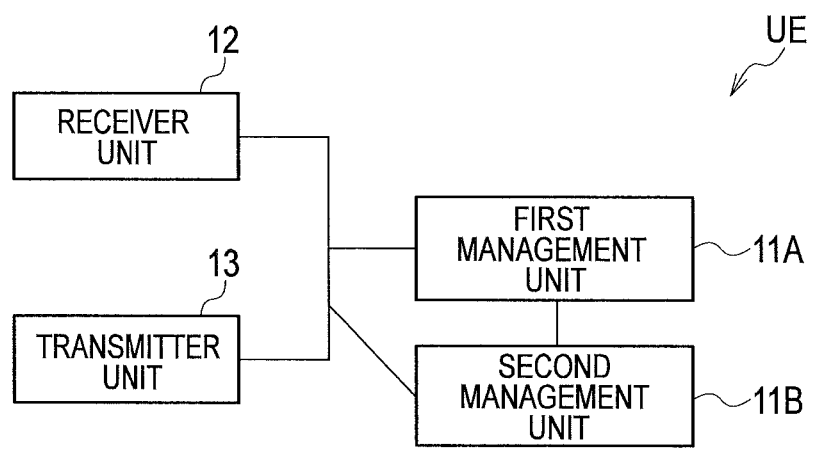
FIG. 2 is a function block diagram of a mobile station according to the first embodiment of the present invention.

The mobile station UE according to the present embodiment is provided with a first management unit 11A, a second management unit 11B, a receiver unit 12, and a transmitter unit 13, as illustrated in FIG. 2.

The receiver unit 12 is configured to receive various kinds of signals from the radio base station eNB, and the transmitter unit 13 is configured to transmit various kinds of signals to the radio base station eNB.

The first management unit 11A is configured to manage a pTAG that includes a Pcell, and an sTAG that include no Pcell.

Here, the first management unit 11A is configured to determine which Scell is to belong to each of the pTAG and the sTAG on the basis of an "RRC Connection Reconfiguration (TAG modification)" or the like received by the receiver unit 12.

The second management unit 11B is configured to manage an "UL Cell" and a "DL Cell" where to perform a downlink communication, while associating the "UL Cell" with the "DL cells" on the basis of an SIB2 received by the receiver unit 12.

Further, the first management unit 11A is configured to manage a "timing reference cell" and a "Pathloss reference cell" for a Pcell in the pTAG as the Pcell.

Moreover, the first management unit 11A is configured to manage a "timing reference cell" for an Scell in the pTAG as a Pcell.

Moreover, the first management unit 11A is configured to manage the "Pathloss reference cell" for an Scell in the pTAG as the Pcell or one of "SIB2 linked cells" for the Scell designated by a network.

Further, the first management unit 11A is configured to manage the "timing reference cell" for an Scell in the sTAG as one of the cells in the sTAG selected by the mobile station UE.

In addition, the first management unit 11A is configured to manage the "Pathloss reference cell" for an Scell in the sTAG as one of "SIB2 linked cells" for the Scell selected by the mobile station UE.

In summary, the first management unit 11A is configured not to allow the network to designate the "timing reference cell" and the "Pathloss reference cell" for the Scell in the sTAG.

Meanwhile, the second management unit 11B is configured to use the "UL Cell" managed in association with the "DL only Cell" as a Pcell or an Scell in the pTAG.

As a result, the second management unit 11B does not use the "DL only Cell" as an "SIB2 linked cell" for the Scell in the sTAG.

Accordingly, a situation can never occur where the mobile station UE selects the "DL only Cell" as the "timing reference cell" and the "Pathloss reference cell" for the Scell in the STAG.

Note that, the second management unit 11B may be configured to manage a "DL only Cell" and a Pcell or an Scell in the pTAG while associating them with each other in accordance with an instruction (for example, SIB2) from the network.

Alternatively, the second management unit 11B may be configured to autonomously manage a "DL only Cell" and the Pcell in the pTAG while associating them with each other.

Moreover, the second management unit 11B may be configured to autonomously manage a "DL only Cell" and the Scell with the largest "Scell Index" among Scells in the pTAG, while associating them with each other.

Alternatively, the second management unit 11B may be configured to autonomously manage a "DL only Cell" and an Scell with the smallest "Scell Index" among Scells in the pTAG, while associating them with each other.

Hereinafter, an operation of the mobile station UE according to the present embodiment will be described with reference to FIG. 3.

Figure 3:
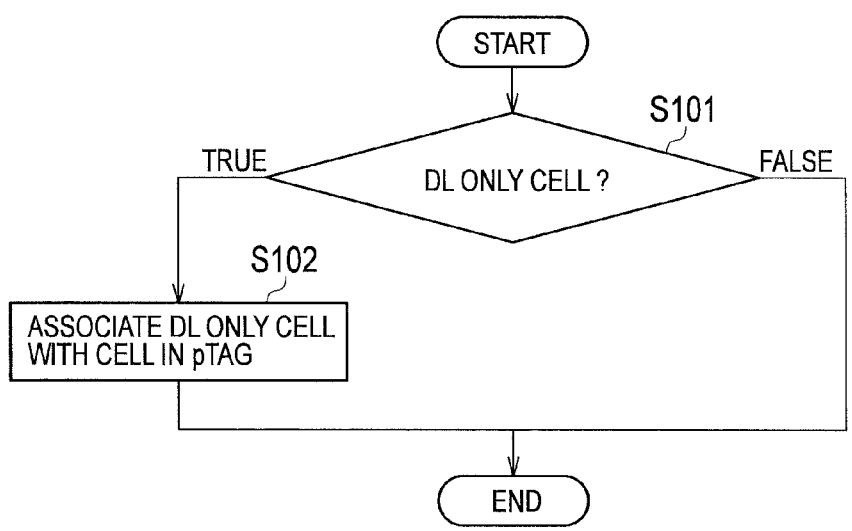
FIG. 3 is a flowchart for explaining an operation of the mobile station according to the first embodiment of the present invention.
Figure 4:
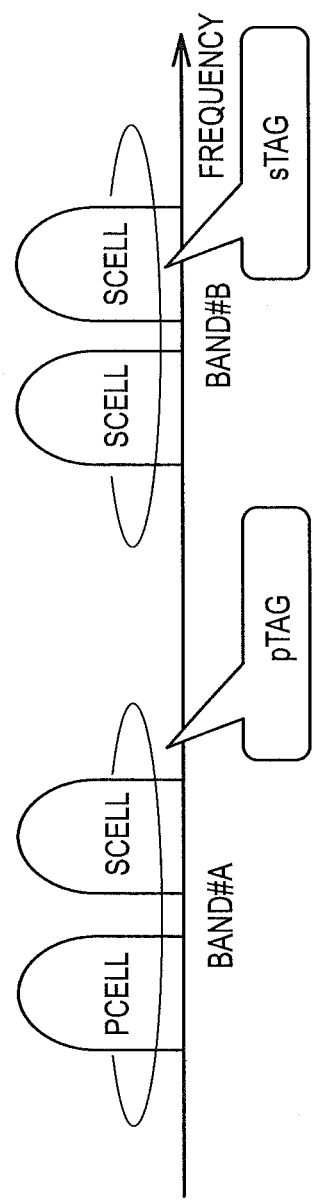
FIG. 4 is a view for explaining a conventional mobile communication system.
Figure 6:
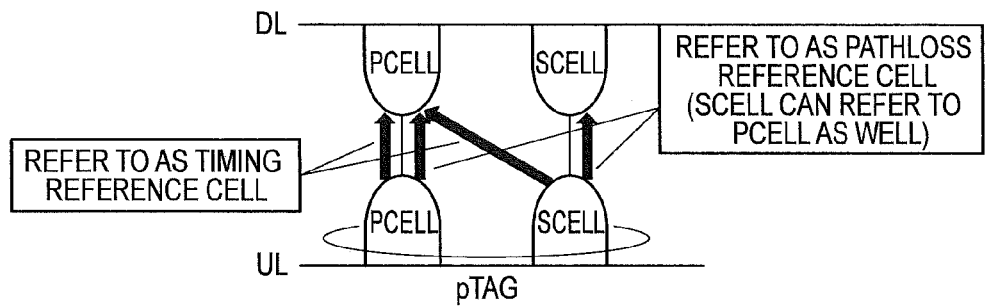
FIG. 6 is a view for explaining the conventional mobile communication system.
Figure 7:
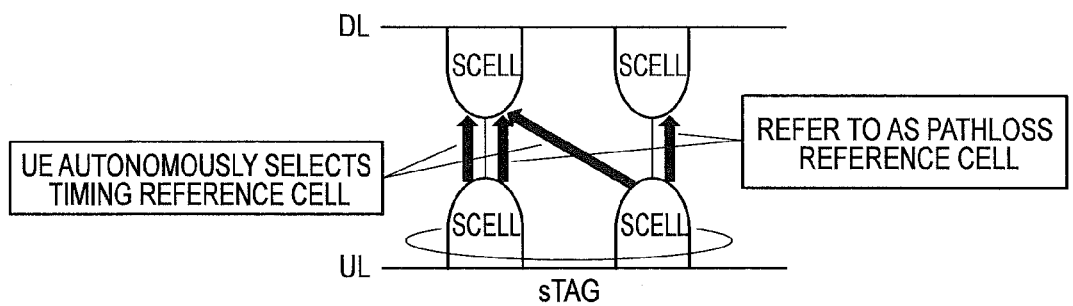
FIG. 7 is a view for explaining the conventional mobile communication system.
Figure 8:
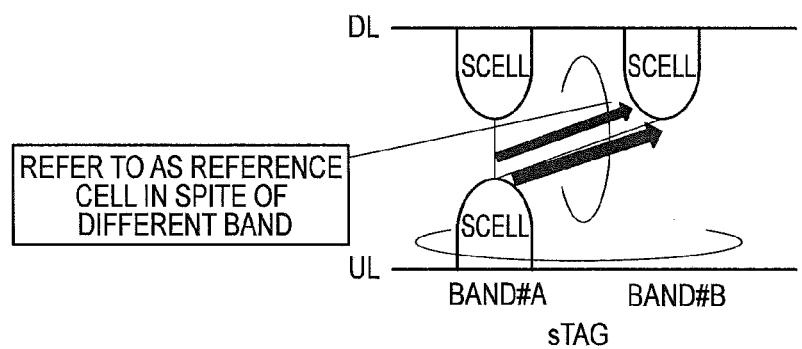
FIG. 8 is a view for explaining the conventional mobile communication system.

As illustrated in FIG. 3, when detecting a "DL only Cell" at step S101, the mobile station UE manages the "DL only Cell" and a Pcell or an Scell in a pTAG while associating them with each other at step S102.

As described the above, the mobile communication system according to the present embodiment can prevent a situation where a mobile station UE selects a "DL only Cell" as the "timing reference cell" and the "Pathloss reference cell" for an Scell in the sTAG, and enables the mobile station UE to appropriately select the "timing reference cell" and the "Pathloss reference cell" for the Scell in the sTAG.

The above-described features of the embodiment may also be expressed as follows.

A first feature according to the present embodiment is summarized as a mobile station UE configured to be capable of performing CA (carrier aggregation) using a Pcell (primary cell) and an Scell (secondary cell) includes: a first management unit 11A configured to manage a pTAG (primary timing adjustment group) that includes the Pcell, and an sTAG (secondary timing adjustment group) that does not include the Pcell; and a second management unit 11B configured to manage an "UL Cell (uplink cell)" where to perform an uplink communication and a "DL Cell (downlink cell)" where to perform a downlink communication while associating the "UP Cell" with the "DL cell", in which: the first management unit 11A is configured to manage each of a "timing reference cell (timing reference cell)" and a "Pathloss reference cell (Pathloss reference cell)" for each of the Pcell and the Scell in the pTAG, as the Pcell or a cell designated by a network; the first management unit 11A is configured not to allow the network to designate a "timing reference cell" and a "Pathloss reference cell" for the Scell in the sTAG; and the second management unit 11B is configured to use the "UL Cell" managed in association with a "DL only Cell (downlink only cell)" where to perform the downlink communication only, as the Pcell or the Scell in the pTAG.

In the first feature according to the present embodiment, the second management unit 11B may be configured to manage the "DL only Cell" and the Pcell or the Scell in the pTAG while associating them with each other in accordance with an instruction from the network.

The above configuration can prevent a situation where the mobile station UE selects a "DL only Cell" as the "timing reference cell" and the "Pathloss reference cell" for the Scell in the sTAG, and determines transmission timing in an uplink by referring to the "DL Cell" having radio characteristics completely different from those of the "UL Cell", or reports a path loss of the "DL Cell" having a different radio quality, by using an existing mechanism (SIB2) on a network side without needing the complicated implementation configuration of the mobile station UE.

In the first feature according to the present embodiment, the second management unit 11B may be configured to autonomously manage the "DL only Cell" and the Pcell in the pTAG while associating them with each other.

The above configuration can prevent a situation where the mobile station UE selects a "DL only Cell" as the "timing reference cell" and the "Pathloss reference cell" for the Scell in the sTAG, and determines transmission timing in an uplink by referring to the "DL Cell" having radio characteristics completely different from those of the "UL Cell", or reports a path loss of the "DL Cell" having a different radio quality, without needing the complicated implementation configuration in an radio base station eNB while reducing overhead in signaling.

In the first feature according to the present embodiment, the second management unit 11B may be configured to autonomously manage the "DL only Cell" and the Scell with the largest "Scell Index (identification information)" among the Scells in the pTAG while associating these cells with each other.

The above configuration can prevent a situation where the mobile station UE selects a "DL only Cell" as the "timing reference cell" and the "Pathloss reference cell" for the Scell in the sTAG, and determines transmission timing in an uplink by referring to the "DL Cell" having radio characteristics completely different from those of the "UL Cell", or reports a path loss of the "DL Cell" having a different radio quality, without needing the complicated implementation configuration in an radio base station eNB while reducing overhead in signaling.

In the first feature according to the present embodiment, the second management unit 11B may be configured to autonomously manage the "DL only Cell" and the Scell with the smallest "Scell Index" among the Scells in the pTAG while associating these cells with each other.

The above configuration can prevent a situation where the mobile station UE selects a "DL only Cell" as the "timing reference cell" and the "Pathloss reference cell" for the Scell in the sTAG, and determines transmission timing in an uplink by referring to the "DL Cell" having radio characteristics completely different from those of the "UL Cell", or reports a path loss of the "DL Cell" having a different radio quality, without needing the complicated implementation configuration in an radio base station eNB while reducing overhead in signaling.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiment. However, it is apparent to those skilled in the art that the present invention should not be limited to the embodiment described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-174141 (filed on Aug. 6, 2012) is incorporated by reference in the present specification.

INDUSTRIAL APPLICABILITY

As described the above, the present invention can provide a mobile station capable of appropriately selecting a "timing reference cell" and a "Pathloss reference cell" for an Scell in an sTAG.

EXPLANATION OF THE REFERENCE NUMERALS

UE mobile station
eNB radio base station
11A first management unit
11B second management unit
12 receiver unit
13 transmitter unit

The invention claimed is:

1. A mobile station that performs carrier aggregation using a primary cell (Pcell) and a secondary cell (Scell), the mobile station comprising: circuitry that
manages a primary timing adjustment group (pTAG) that includes the Pcell, and a secondary timing adjustment group (sTAG) that does not include the Pcell,
associates a downlink (DL) only cell with one of the Pcell and the Scell in the pTAG, and
associates a DL cell corresponding to an uplink (UL) cell with one of the pTAG and the sTAG, wherein
the circuitry autonomously associates the DL only cell with the Pcell or the Scell in the pTAG without an instruction from a network,
the circuitry manages each of a timing reference cell and a Pathloss reference cell for each of the Pcell and the S cell in the pTAG, as the Pcell in the pTAG or a cell designated by the network, and
the circuitry does not allow the network to designate a timing reference cell and a Pathloss reference cell for the Scell in the sTAG.

* * * * *